US010850362B2

(12) United States Patent
Jiang et al.

(10) Patent No.: US 10,850,362 B2
(45) Date of Patent: Dec. 1, 2020

(54) METHOD OF MANUFACTURING OPHTHALMIC LENSES AND SYSTEM FOR THE MANUFACTURING OF SUCH OPHTHALMIC LENSES

(71) Applicant: ESSILOR INTERNATIONAL, Charenton-le-Pont (FR)

(72) Inventors: Peiqi Jiang, Dallas, TX (US); Gabriel Keita, Dallas, TX (US); Leanirith Yean, Essilor Buidling (SG); Gilles Baillet, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 224 days.

(21) Appl. No.: 16/164,454

(22) Filed: Oct. 18, 2018

(65) Prior Publication Data

US 2019/0047107 A1    Feb. 14, 2019

Related U.S. Application Data

(62) Division of application No. 14/759,530, filed as application No. PCT/IB2013/000438 on Jan. 9, 2013, now Pat. No. 10,131,029.

(51) Int. Cl.
*B24B 9/14*     (2006.01)
*B24B 13/005*   (2006.01)
*B29D 11/00*    (2006.01)

(52) U.S. Cl.
CPC ............ *B24B 9/146* (2013.01); *B24B 13/005* (2013.01); *B29D 11/00942* (2013.01)

(58) Field of Classification Search
CPC .............. B24B 13/005; B24B 13/0052; B24B 13/0057
See application file for complete search history.

(56) References Cited

U.S. PATENT DOCUMENTS 3,049,766 A * 8/1962 Buckminster ....... B24B 13/0052
                                                    164/4.1
3,226,887 A * 1/1966 Rudd ........................ B24B 9/14
                                                    451/42

(Continued)

FOREIGN PATENT DOCUMENTS

EP    2 093 018 A1    8/2009
EP    2 255 925 A1    12/2010

*Primary Examiner* — Tyrone V Hall, Jr.
(74) *Attorney, Agent, or Firm* — Nixon & Vanderhye

(57) ABSTRACT

The invention concerns a method of manufacturing an ophthalmic lens, comprising the steps of providing, mounting and blocking a substrate (10) on a machining support unit (65), surfacing an upper face (12) of said substrate, edging a peripheral edge (13) of said substrate, wherein said machining support unit comprises a surfacing member (40) and an edging member (30) which are separable, said surfacing member having a cavity (51) in which said edging member is located during said step of surfacing, said surfacing and edging members being configured so that said substrate is mounted and blocked on said machining support unit in a first predetermined position for the surfacing and the edging and, between said steps of surfacing and edging, the method comprises the step of withdrawing said surfacing member from said machining support unit by retaining said substrate on said edging member.

20 Claims, 3 Drawing Sheets

(56) References Cited

U.S. PATENT DOCUMENTS

| | | | | |
|---|---|---|---|---|
| 3,271,912 | A | * | 9/1966 | Buckminster ......... B24B 13/005 |
| | | | | 451/390 |
| 3,522,677 | A | * | 8/1970 | Irwin ................. B24B 13/0052 |
| | | | | 451/42 |
| 3,624,976 | A | | 12/1971 | Mccall et al. |
| 4,382,351 | A | * | 5/1983 | Sorrells .............. B24B 13/0057 |
| | | | | 451/384 |
| 4,556,605 | A | | 12/1985 | Mogami |
| 4,844,143 | A | * | 7/1989 | Herbin ................... B29C 70/78 |
| | | | | 164/332 |
| 5,763,075 | A | * | 6/1998 | Benjamin ........... B24B 13/0052 |
| | | | | 428/349 |
| 5,785,580 | A | * | 7/1998 | Cook ................... B24B 13/005 |
| | | | | 451/384 |
| 2001/0051490 | A1 | * | 12/2001 | Siders ................ B24B 27/0076 |
| | | | | 451/5 |

\* cited by examiner

METHOD OF MANUFACTURING OPHTHALMIC LENSES AND SYSTEM FOR THE MANUFACTURING OF SUCH OPHTHALMIC LENSES

FIELD OF THE INVENTION

The invention relates to the manufacturing of a lens such as an ophthalmic lens, and a system for the manufacturing of such an ophthalmic lens.

BACKGROUND ART

It is well known that lenses, and in particular spectacle lenses, comprise an ophthalmic substrate having geometrical features adapted to the wearer.

Some coatings can be added on the ophthalmic substrate to obtain a finished ophthalmic lens. The coatings are for instance an anti-abrasive coating to increase the abrasion resistance of the lens, and/or an anti-reflective coating to decrease the reflection of light and/or an anti-soiling coating applied over the anti-reflective coating.

One known method to manufacture an ophthalmic substrate is described in European patent application EP 2 093 018, in which a single blocking piece is provided for surfacing and edging the ophthalmic substrate.

The blocking piece is made from a plastic material moulded in a single piece and is configured to receive an optical substrate, also named blank.

The blocking piece has a reception zone of the blank which is delimited by a peripheral outline and which has a diameter similar to the diameter of the blank.

The blank is mounted and fixed to the blocking piece, a first face of the blank facing a mounting face of the blocking piece.

The system formed by the blank and the blocking piece is then mounted on a surfacing machine for the surfacing of a second face of the blank, the second face being opposite to the first face.

Next, a step of surfacing of the second face of the blank is carried out.

The system formed by the blocking piece and the blank whose second face is machined is then transferred to an edging machine (for instance a grinder) for the edging of a peripheral edge of the blank, which edge links the first and second faces of the blank.

Next, a step of edging of the edge of the blank is carried out. During, the step of edging, the outline of the single blocking piece is further machined.

A substantial portion of the single blocking piece is removed because the step of edging generally machines the blank from a maximum first diameter, for instance equal to around 70 mm, to a maximum second diameter smaller than the first diameter, for instance 30 mm. The second face and the outline of the blank are thus machined in order to form the ophthalmic lens (or at least the ophthalmic substrate) which is cut and has a shape similar to a shape of the spectacle frame on which the ophthalmic lens is configured to be mounted.

The single blocking piece made from plastic material is thus here a disposable blocking piece.

The invention is directed to a method of manufacturing an ophthalmic lens, comprising a step of surfacing and a step of edging, the method being simple, convenient and economical to carry out.

SUMMARY OF THE INVENTION

The invention accordingly provides a method of manufacturing an ophthalmic lens having a first face, a second face opposite to said first face and a peripheral outline linking said first and second faces, the method comprising the following steps:

provide a substrate having a lower face, an upper face opposite to said lower face and a peripheral edge linking said lower and upper faces;

providing a machining support unit configured to receive said substrate;

mounting said substrate on said machining support unit and blocking said substrate with said machining support unit, said lower face of said substrate facing a mounting face of said machining support unit;

surfacing said upper face of said substrate;

edging said peripheral edge of said substrate;

wherein said machining support unit comprises a surfacing member and an edging member separable from said surfacing member, said surfacing member having a cavity defining an internal space in which said edging member is located during said step of surfacing, said surfacing member and edging member being configured so that said substrate is mounted and blocked on said machining support unit in a first predetermined position for the surfacing of said upper face and for the edging of said peripheral edge, and, between said steps of surfacing and edging, the method further comprises the step of withdrawing said surfacing member from said machining support unit by retaining said substrate on said edging member.

Thanks to the method according to the invention, the substrate is only once positioned, is blocked for the step of surfacing and is not unblocked for the step of edging. This is the removal of the surfacing member which allows the step of edging to be carried out.

The positioning of the substrate in the first predetermined position on the machining support unit, in other words relative to the surfacing member and relative to the edging member, is even retained after the step of surfacing so that the step of edging can be directly carried out. The positioning reference is thus not lost between surfacing and edging, by virtue of which the method according to the invention allows to improve the quality of the ophthalmic lens.

Contrarily to the disposable blocking piece of the state of the art described above, the machining support unit used in the method according to the invention is reusable.

The method of manufacturing according to the invention is thus precise, simple, convenient and economical to carry out.

According to features preferred as being very simple, convenient and economical for embodying the method according to the invention:

it further comprises between said steps of surfacing and edging, a step of polishing said upper face surfaced;

it further comprises a step of coating said upper face and/or said lower face of said substrate, for instance with an anti-reflective coating, a photochromic coating, a polarizing coating, a top-coat or a hard coat, between or after said steps of surfacing and edging;

said substrate is fixed to said mounting face of said machining support unit by the intermediary of a fastening member; and/or said substrate comprises a first reference point of said upper face corresponding to a rotation center of a said substrate relative to a first machining referential of a surfacing machine, said substrate further comprises a second reference point corresponding to an optical center and/or a boxing center of said substrate relative to a geometrical shape of said ophthalmic lens and to a second machining referential of an edging machine, and said first predetermined position is defined by an alignment of said first reference point of said substrate with a first geometrical center of said surfacing member and an alignment of said second reference point of said substrate with a second geometrical center of said edging member.

The invention further provides a system for the manufacturing of an ophthalmic lens having a first face, a second face opposite to said first face and a peripheral outline linking said first and second faces, said system comprising:
- a substrate having a lower face, an upper face opposite to said lower face and a peripheral edge linking said lower and upper faces;
- a machining support unit comprising a mounting face configured to receive said substrate for surfacing of said upper face of said substrate and further for edging of said peripheral edge of said substrate;
- wherein said machining support unit comprises a surfacing member and an edging member separable from said surfacing member, said surfacing member has a cavity defining an internal space in which said edging member is configured to be located during said surfacing of said upper face, said surfacing member and edging member are configured so that said substrate is mounted and blocked on said machining support unit in a first predetermined position for said surfacing of said upper face and for said edging of said peripheral edge, and said surfacing member and edging member are further configured so that said surfacing member is able to be withdrawn from said machining support unit by retaining said substrate on said edging member for said edging of said peripheral edge.

Thanks to the removability of the surfacing member from the machining support unit, the system according to the invention is thus configured so that the substrate is only once positioned, is blocked for a step of surfacing and is not unblocked for a step of edging. Only the surfacing member has to be removed from the machining support unit to directly carry out the step of edging.

The positioning of the substrate in the first predetermined position on the machining support unit, in other words relative to the surfacing member and relative to the edging member, is retained even after the removal of the surfacing member from the machining support unit. The positioning reference is thus not lost between surfacing and edging, by virtue of which the method according to the invention allows to improve the quality of the ophthalmic lens.

Contrarily to the disposable blocking piece of the state of the art described above, the machining support unit of the system according to the invention is reusable.

The system according to the invention is thus precise, simple, convenient and economic.

According to features preferred as being very simple, convenient and economical for embodying the system according to the invention:
- said mounting face is formed by an internal face of said surfacing member and an upper face of said edging member;
- said internal face of said surfacing member and said upper face of said edging member are configured to form a first shape which matches with a second shape of said lower face of said substrate;
- said surfacing member is formed by a ring comprising a body having a generally cylindrical shape, said body having said cavity and comprising an internal lateral face and an internal bottom face formed in said cavity which defines said internal face;
- said body further comprises a recess formed in said internal bottom face, said recess forming a housing configured to receive said edging member;
- said body further comprises a base configured to be mounted on a surfacing machine and on an edging machine;
- said edging member is formed by a pin which is accommodated into said cavity of said surfacing member;
- it further comprises a fastening member located at least partially on said mounting face and sandwiched between said machining support unit and said lower face of said substrate;
- said fastening member has a diameter at least equal or greater than a diameter of an upper face of said edging member; and/or
- said fastening member is formed by an adhesive film.

BRIEF DESCRIPTION OF THE DRAWINGS

The description of the invention now continues with a detailed description of a preferred embodiment given hereinafter by way of non-limiting example and with reference to the appended drawings. In these drawings.

DETAILED DESCRIPTION OF PREFERRED EMBODIMENTS

Figure 1:
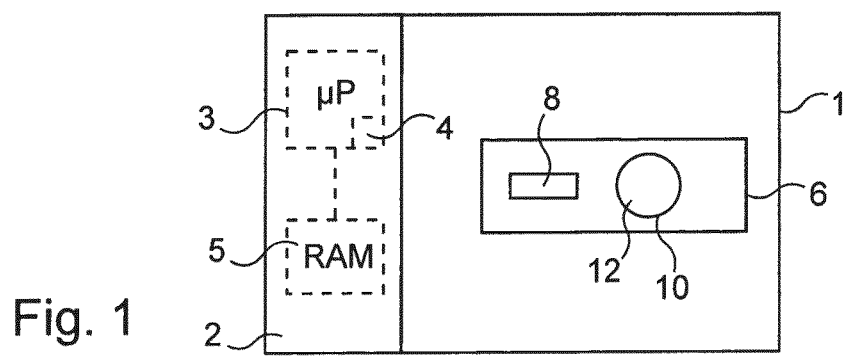
FIG. 1 is a perspective view partially and schematically showing a manufacturing machine configured to manufacture an ophthalmic lens.
Figure 2:
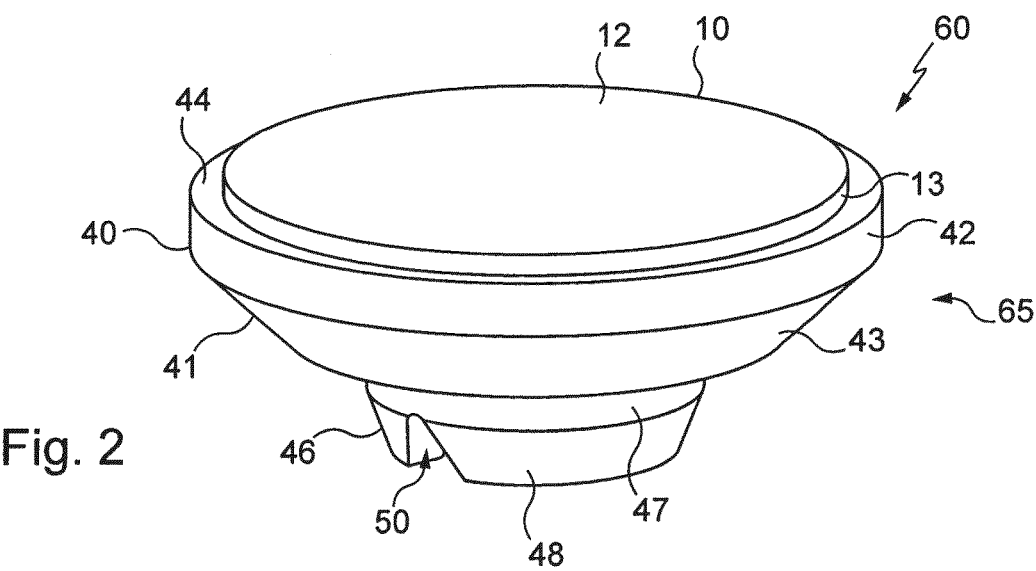
FIG. 2 is a perspective view schematically showing a system for the manufacturing of an ophthalmic lens, comprising a machining support unit for surfacing and edging an ophthalmic substrate mounted on this support.
Figure 3:
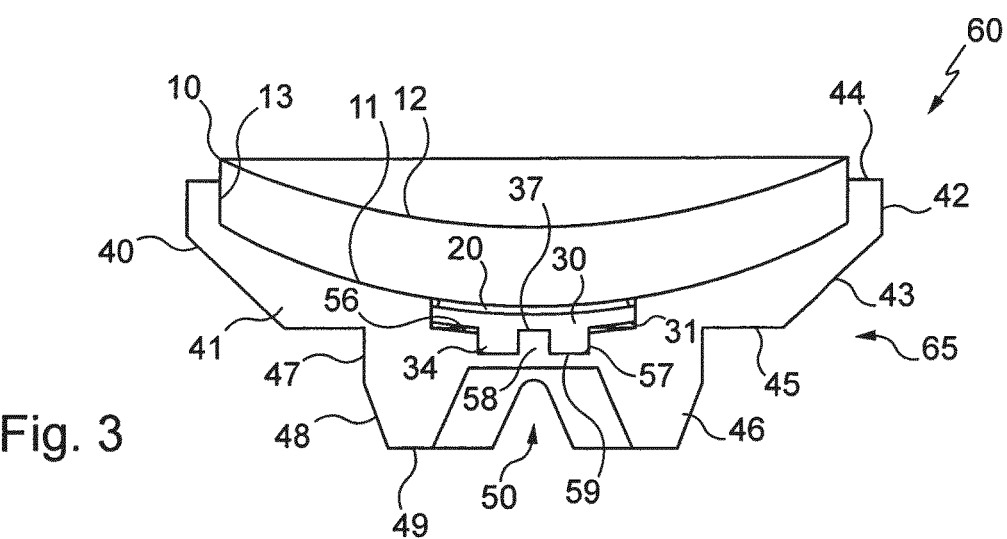
FIG. 3 is a sectional median view of the system shown in FIG. 2.
Figure 4:
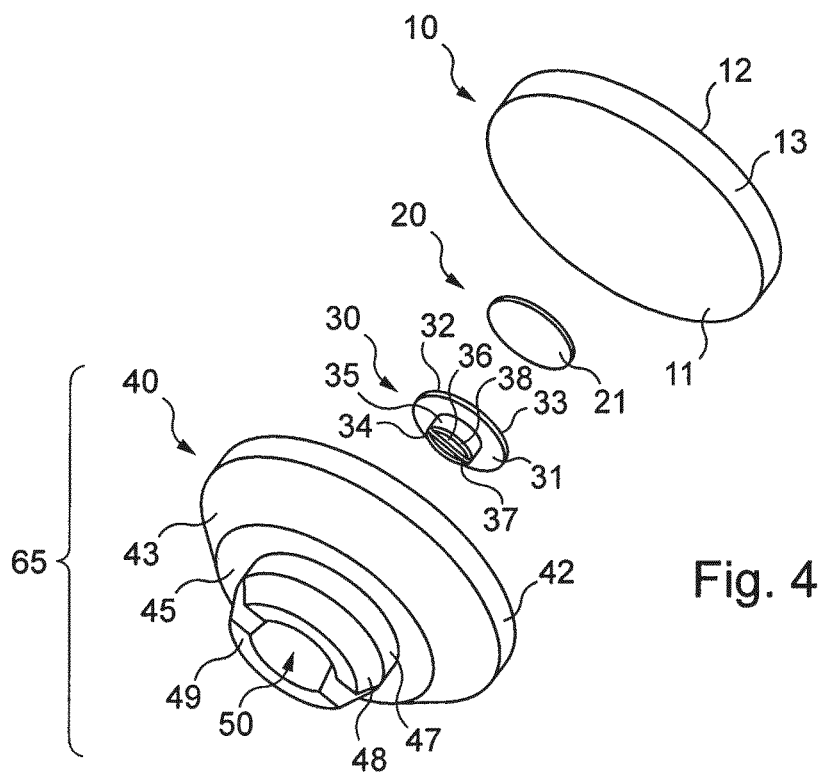
FIGS. 4 and 5 are exploded perspective views of the system shown on FIG. 2, taken under two different view angles.
Figure 5:
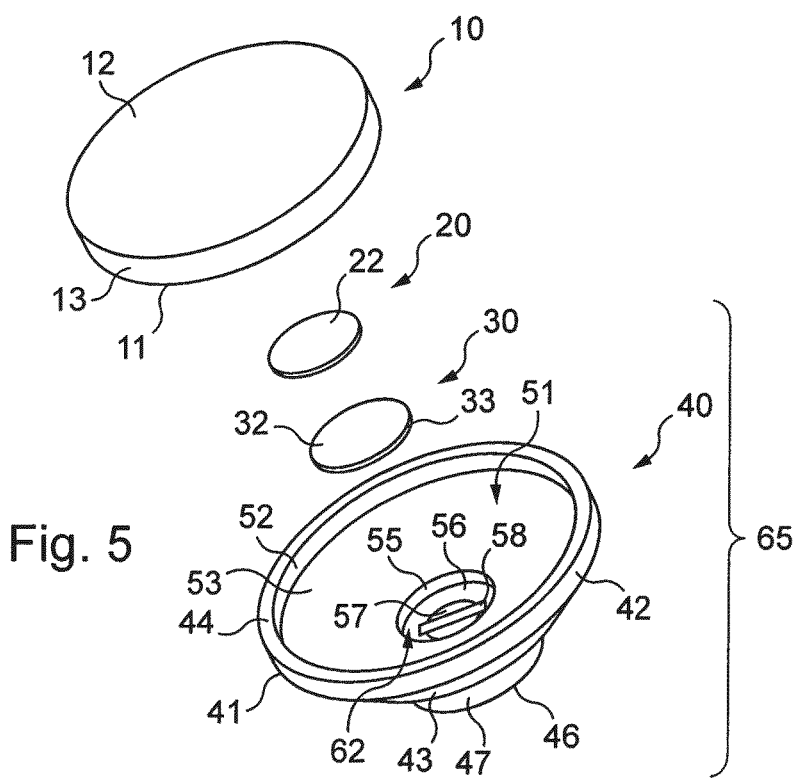

FIG. 1 shows a numerical-control "free-form" machine 1, numerical control denoting the set of equipment and software, the function of which is to give movement instructions to all the elements of the machine 1.

This machine 1 is configured for machining by turning (surfacing) an upper face 12 of an ophthalmic substrate 10 in order to form a second face of an ophthalmic lens, including a surface of a progressive lens further having toric and/or prismatic components.

To this end, the machine 1 comprises a surfacing tool 8 and a control unit 2 comprising a microprocessor 3 having a memory 4, in particular a non-volatile memory, allowing it to load and store software, in other words a computer program, which when it is executed in the microprocessor 3, allows the implementation of a manufacturing method according to the invention. This non-volatile memory 4 is for example of the ROM ("read only memory") type.

The control unit 2 further comprises a memory 5, in particular a volatile memory, allowing data to be stored during the execution of the software and the implementation of the method.

This volatile memory 5 is for example of the RAM or EEPROM type (respectively "random access memory" and "electrically erasable programmable read only memory").

The machine 1 further comprises a glazed aperture 6 suitable for allowing the upper face 12 of the substrate 10 on which the machine 1 is operating to be viewed.

This glazed aperture 6 makes it possible, during the implementation of the method, for a user of the machine 1 to monitor the satisfactory progress of the method by viewing the substrate 10 in the machine 1.

The machine 1 can also be configured for polishing the upper face 12 and for edging a peripheral edge 13 of the ophthalmic substrate 10 in order to form the ophthalmic lens.

To this end, the surfacing tool 8 has to be replaced by a polishing tool and/or an edging tool.

In variant, the polishing machine and/or the edging machine are (is) distinct from the surfacing machine and the polishing machine and/or the edging machine are (is) substantially similar to the surfacing machine, except that there is no surfacing tool but a polishing tool and/or an edging tool.

FIGS. 2 to 5 show a system 60 for the manufacturing of the ophthalmic lens from the ophthalmic substrate 10.

The system 60 comprises the ophthalmic substrate 10, a fastening (or fixation) member 20 and a machining support unit 65.

The ophthalmic substrate 10 comprises the upper face 12, a lower face 11 opposite to the upper face 12 and the peripheral edge 13 linking the lower and upper faces 11 and 12.

The ophthalmic substrate 10 has here a diameter equal to about 70 mm.

The lower face 11 is configured to form a first face, also named front face, of the ophthalmic lens.

The upper face 12 is configured to form (after surfacing) a second face, also named rear face, of the ophthalmic lens.

The second face is opposite to the first face.

The peripheral edge 13 is configured to form (after edging) a peripheral outline of the ophthalmic lens, the peripheral outline linking the first and second faces.

Here, the lower face 11 of the substrate 10 is convex. The lower face 11 comprises optical properties (for instance simple for a single vision lens or complex for a progressive lens), and already forms the front face of the ophthalmic lens. That is why the substrate 10 is here named ophthalmic substrate. Such ophthalmic substrate 10 can also be named semi-finished blank.

The fastening member is formed by an adhesive film 20 which has a first adhesive face 21 and a second adhesive face 22 opposite to the first adhesive face 21.

The first adhesive face 21 is configured to be fixed on the machining support unit 65 and the second adhesive face 22 is configured to be fixed on the lower face 11 of the ophthalmic substrate 10. The adhesive film 20 is deformable.

The machining support unit 65 is configured to receive the ophthalmic substrate 10 for surfacing the upper face 12 and further for edging the peripheral edge 13.

The machining support unit 65 comprises a surfacing member 40 and an edging member 30.

The edging member 30 is made from a plastic material moulded in a single piece.

The edging member is formed by a pin 30 which comprises a circular flange having a lower face 31, an upper face 32 opposite to the lower face 31 and a peripheral outline 33 linking the lower and upper faces 31 and 32.

The upper face 32 is configured to partially form a mounting face of the machining support unit 65.

This upper face 32 has a general curved-shape which matches at least partially with the shape of the lower face 11 of the ophthalmic substrate 10.

The pin 30 further comprises a block 34 which protrudes from the lower face 31.

The block 34 comprises a lateral wall which extends from the lower face 31.

The block 34 further comprises a beveled portion 38 at least partially circular and linked to the cylindrical lateral wall 35.

The block 34 further comprises a notch 37 diametrically formed in the cylindrical lateral wall 35.

The block 34 further comprises a bearing face 36 at a free end of the block 34 (at the opposite of the lower face 31).

The pin 30 is configured to be accommodated in the surfacing member 40.

The pin 30 is further configured to be separable from this surfacing member 40.

The surfacing member is formed by a ring 40 made from a plastic material moulded in a single piece.

The ring 40 comprises a body 41 having a generally cylindrical shape.

The body 41 comprises a cylindrical lateral wall 42 which defines an internal lateral face 52 and a free edge 44.

The body 41 further comprises a tapered wall 43 linked to the cylindrical lateral wall 42 at the opposite of the free edge 44.

The body 41 further comprises a bottom wall 45 linked to the tapered wall 43 at the opposite of the cylindrical lateral wall 42.

The tapered wall 43 and the bottom wall 45 define an internal bottom face 53 of the ring 40.

The internal lateral face 52 and the internal bottom face 53 (the latter being tapered) define an internal space of a cavity 51 of the ring 40.

The internal lateral face 52 and the internal bottom face 53 further partially form the mounting face of the machining support unit 65, together with the upper face 32 of the pin 30.

The internal bottom face 53 is configured to have a shape which partially matches with the shape of the lower face 11 of the ophthalmic substrate 10.

It should further be noted that the internal lateral face 52 is configured to have a shape which partially matches with the shape of the peripheral edge 13 of the ophthalmic substrate 10.

The body 41 further comprises a base 46 configured to be mounted on a surfacing machine and on an edging machine as shown in FIG. 1.

The base 46 comprises a lateral wall 47 linked to the bottom wall 45, a tapered wall 46 linked to the lateral wall 47 and a bearing face 49 at a free end of the base 46, the free end being opposite to the bottom wall 45.

The base 46 further comprises a slot 50 diametrically formed on the tapered wall 48.

The slot 50 forms two notches in the tapered wall 48 and a centrally opening between these two notches.

The body 41 further comprises a recess formed in the internal bottom face 53, the recess forming a housing 62 configured to receive the pin 30.

The housing 62 comprises a wall 55 linked to the internal bottom face 53, a bottom 56 linked to the wall 55 at the opposite of the internal bottom face 53 and two grooves 57 formed in the bottom 56.

Each groove 57 has a bottom 59 and the two grooves 57 are separated from each other by a rib 58.

It should be noted that the housing 62 belongs to the cavity 51 which defines an internal space in which the pin 30 is configured to be located.

We will now describe in detail the system 60 having the ophthalmic substrate 10, the adhesive film 20 and the machining support unit 65 (in other words the pin 30 together with the ring 40) which are assembled.

The pin 30 is accommodated in the housing 62 of the ring 40.

The lower face 31 of the pin 30 faces the bottom 56.

The block 34 is partially introduced in the grooves 57, the bearing face 36 of the block 34 coming into abutment against the bottom 59 of the grooves 57, and the rib 58 is received in the notch 37.

The pin 30 is thus mounted and positioned in a predetermined position in the ring 40.

As mentioned above, the mounting face of the machining support unit 60 is here formed by the internal bottom face 53 of the ring 40 and by the upper face 32 of the pin 30.

The adhesive film 20 is fixed by its first adhesive face 21 on the upper face 32 of the pin 30.

The adhesive film 20 has here a diameter which is slightly smaller than the diameter of the pin 30.

The ophthalmic substrate 10 is mounted on the mounting face of the machining support unit 65. The lower face 11 of the ophthalmic substrate 10 faces the internal bottom face 53 of the ring 40 and further faces the second adhesive face 22 of the adhesive film 20 together with the upper face 32 of the pin 30.

The adhesive film 20 is thus partially located on the mounting face and is sandwiched between the machining support unit 65 and the lower face 11 of the ophthalmic substrate 10.

The peripheral edge 13 of the ophthalmic substrate 10 partially faces the internal lateral face 52 of the ring 40.

The lower face 11 of the ophthalmic substrate 10 comes into abutment against the second adhesive face 22 of the adhesive film 20.

Thus, the ophthalmic substrate 10 is mounted and fixed to the machining support unit 65, thanks to the internal lateral face 52 and the internal bottom face 53 (for the positioning) and thanks to the upper face 32 of the pin 30 together with the second adhesive face 22 of the adhesive film 20 (for the fixing).

The internal lateral face 52, the internal bottom face 53 and the housing 62 of the ring 40 together with the pin 30 are configured so that the ophthalmic substrate 10 is mounted and blocked (fixed) on the machining support unit 65 in a first predetermined position for the surfacing of the upper face 12 and for the edging of the peripheral edge 13.

The first predetermined position is defined by an alignment of a first reference point of the ophthalmic substrate 10 with a first geometrical center of the ring 40 and further by an alignment of a second reference point of the ophthalmic substrate 10 with a second geometrical center of the pin 30.

The first reference point is in the upper face 12 of the ophthalmic substrate 10 and corresponds to a rotation center of this ophthalmic substrate 10 relative to a first machining referential of the surfacing machine; and the second reference point of the ophthalmic substrate 10 corresponds to an optical center and/or a boxing center of this ophthalmic substrate 10 relative to a geometrical shape of the ophthalmic lens to obtain and relative to a second machining referential of the edging machine. The first machining referential and the second machining referential can be identical or distinct.

The machining support unit 65 is configured so that the ring 40 is able to be removed from the machining support unit 65 by retaining the ophthalmic substrate 10, the adhesive film 20 and the pin 30, after the surfacing of the upper face 12, and for the edging of the peripheral edge 13.

Figure 6:
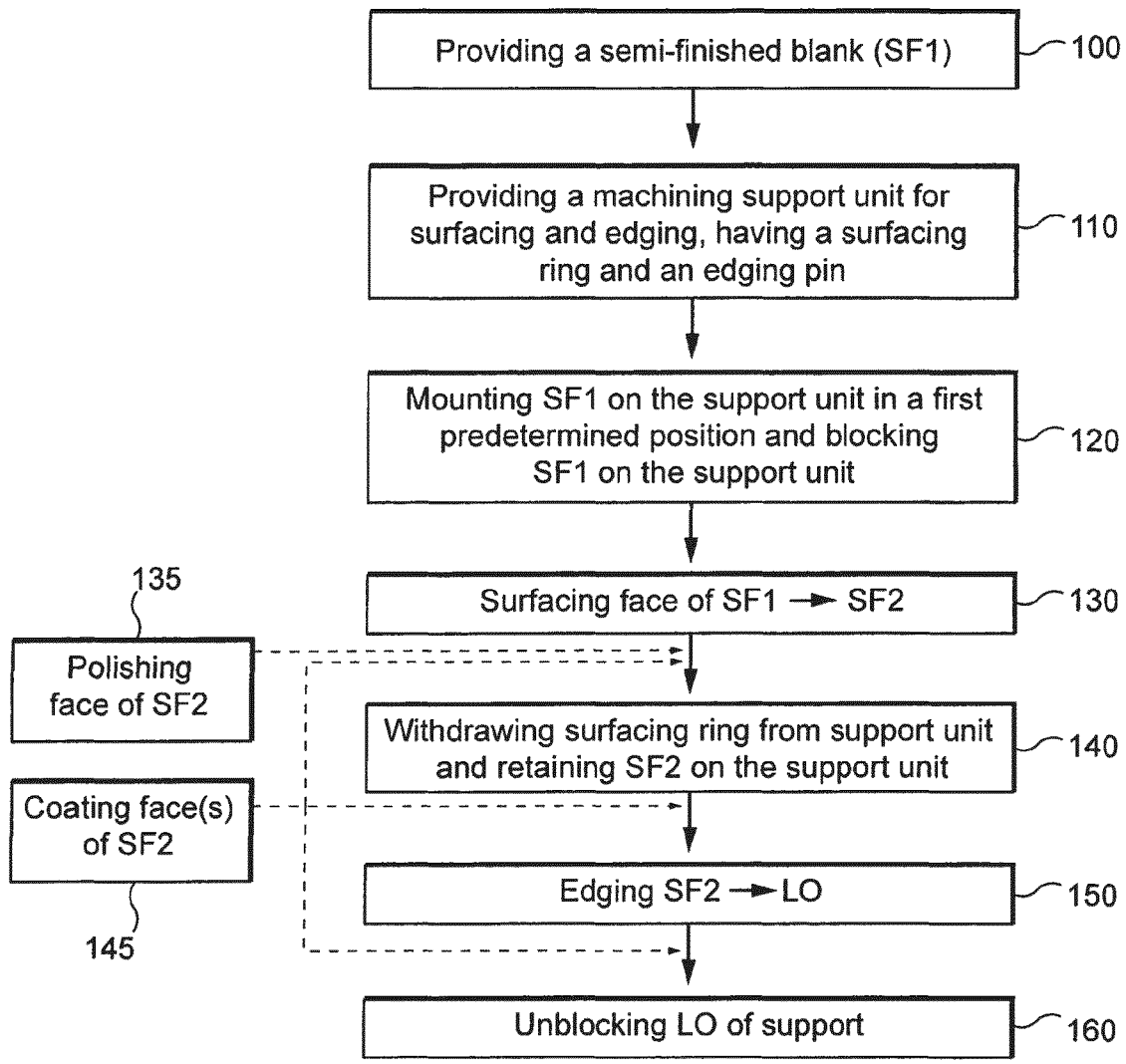
FIG. 6 is a block diagram illustrating different operating steps of the method of manufacturing of the ophthalmic lens.

We will now describe the method for manufacturing the ophthalmic lens in reference to FIG. 6, by using the system 60 described above.

The method comprises a step 100 of providing a semi-finished blank (SF1) here formed by the ophthalmic substrate 10.

The method further comprises a step 110 of providing a machining support unit 65 for surfacing and edging the ophthalmic substrate 10. The machining support unit 65 comprises a surfacing ring 40 and an edging pin 30.

The method further comprises a step 120 of mounting the ophthalmic substrate 10 on the machining support unit 65 in the first predetermined position and blocking (or fixing) the ophthalmic substrate 10 on this machining support unit 65, here by the intermediary of the adhesive film 20.

In this first predetermined position, the lower face 11 of the ophthalmic substrate 10 faces the mounting face (the upper face 32, the internal lateral face 52 and the internal bottom face 53) of the machining support unit 65.

The method further comprises a step 130 of surfacing the upper face 12 of the ophthalmic substrate 10 in order to obtain a surfaced ophthalmic substrate 10.

The method may further comprise a step 135 of polishing the upper face 12 surfaced of the ophthalmic substrate 10 in order to obtain a polished surfaced ophthalmic substrate 10.

The method further comprises a step 140 of withdrawing the surfacing ring 40 from the machining support unit 65 by retaining the ophthalmic substrate 10 together with the pin 30 (the adhesive film 20 being sandwiched between the ophthalmic substrate 10 and the pin 30), in the first predetermined position of the ophthalmic substrate 10 relative to the pin 30.

The method further comprises a step 150 of edging the peripheral edge 13 of the ophthalmic substrate 10 in order to obtain the ophthalmic lens.

The method may further comprise a step of coating the upper face 12 of the ophthalmic substrate 10, for instance with an anti-reflective coating or a photochromic coating or a polarizing coating, to form for instance a top-coat or a hard coat, between the steps of surfacing and edging or after these steps.

The method may further comprise a step of coating the lower face 11 of the ophthalmic substrate 10, for instance with an anti-reflective coating or a photochromic coating or a polarizing coating, to form for instance a top-coat or a hard coat, after the steps of surfacing and edging.

The method further comprises a step 160 of unblocking the ophthalmic lens (or the ophthalmic substrate 10 surfaced and edged) from the pin 30 and thus from the adhesive film 20.

The machining support unit 65 is thus reusable for another method of manufacturing of an ophthalmic lens.

This ophthalmic lens comprises the first face formed from the lower face 11, the second face formed from the surfaced upper face 12 and the peripheral outline formed from the edged peripheral edge 13.

In variants that are not illustrated:
- at least one of the surfacing and edging members is not made from a plastic material but rather from metal;
- the adhesive film may have a diameter at least equal or greater than the diameter of the pin 30, for instance an adhesive film which covers the internal bottom face 53;

the adhesive film may comprise two distinct parts, one of said parts being for instance removable from the mounting face of the machining support unit;

the pin is not made from a single piece but may comprise a plurality of parts;

the fastening member is not formed by an adhesive film which is deformable but rather by a member which is only partially deformable or rigid, for instance a curable resin or a metal sheet;

the surfacing member is not formed by a ring having a generally cylindrical shape and thus does not comprise a cylindrical lateral wall, but the surfacing member is formed by a plate;

the edging member comprises a block having further locking ribs and the surfacing member comprises a housing having further complementary locking ribs configured to cooperate with locking ribs of the block;

the edging member is not formed by a pin having both a flange and a block but only by a flange;

the edging member is greater than the pin shown in FIGS. 2 to 5, and for instance, the edging member forms a major portion of the mounting face;

the edging member does not comprise a block as described above but rather a fastening device like a hook or a quarter turn device, also named bayonet device; and/or the shape of the mounting face does not match with the shape of the lower face of the substrate and a resin is injected between the mounting face and the lower face to wedge the substrate.

It should be more generally noted that the invention is not limited to the described and represented examples.

The invention claimed is:

1. A system for the manufacturing of an ophthalmic lens having a first face, a second face opposite to said first face and a peripheral outline linking said first and second faces, said system comprising:
a substrate having a lower face, an upper face opposite to said lower face and a peripheral edge linking said lower and upper faces;
a machining support unit comprising a mounting face configured to receive said substrate for surfacing of said upper face of said substrate and further for edging of said peripheral edge of said substrate;
wherein said machining support unit comprises a surfacing member and an edging member separable from said surfacing member, said surfacing member has a cavity defining an internal space in which said edging member is configured to be located during said surfacing of said upper face, said surfacing member and edging member are configured so that said substrate is mounted and blocked on said machining support unit in a first predetermined position for said surfacing of said upper face and for said edging of said peripheral edge, and said surfacing member and edging member are further configured so that said surfacing member is able to be withdrawn from said machining support unit by retaining said substrate on said edging member for said edging of said peripheral edge.

2. The system according to claim 1, wherein said mounting face is formed by an internal face of said surfacing member and an upper face of said edging member.

3. The system according to claim 2, wherein said internal face of said surfacing member and said upper face of said edging member are configured to form a first shape which matches with a second shape of said lower face of said substrate.

4. The system according to claim 3, wherein said surfacing member is formed by a ring comprising a body having a generally cylindrical shape, said body having said cavity and comprising an internal lateral face and an internal bottom face formed in said cavity which defines said internal face.

5. The system according to claim 3, wherein said edging member is formed by a pin which is accommodated into said cavity of said surfacing member.

6. The system according to claim 2, wherein said surfacing member is formed by a ring comprising a body having a generally cylindrical shape, said body having said cavity and comprising an internal lateral face and an internal bottom face formed in said cavity which defines said internal face.

7. The system according to claim 6, wherein said body further comprises a recess formed in said internal bottom face, said recess forming a housing configured to receive said edging member.

8. The system according to claim 7, wherein said body further comprises a base configured to be mounted on a surfacing machine and on an edging machine.

9. The system according to claim 7, wherein said edging member is formed by a pin which is accommodated into said cavity of said surfacing member.

10. The system according to claim 6, wherein said body further comprises a base configured to be mounted on a surfacing machine and on an edging machine.

11. The system according to claim 10, wherein said edging member is formed by a pin which is accommodated into said cavity of said surfacing member.

12. The system according to claim 6, wherein said edging member is formed by a pin which is accommodated into said cavity of said surfacing member.

13. The system according to claim 2, wherein said edging member is formed by a pin which is accommodated into said cavity of said surfacing member.

14. The system according to claim 2, wherein it further comprises a fastening member located at least partially on said mounting face and sandwiched between said machining support unit and said lower face of said substrate.

15. The system according to claim 1, wherein said edging member is formed by a pin which is accommodated into said cavity of said surfacing member.

16. The system according to claim 1, wherein it further comprises a fastening member located at least partially on said mounting face and sandwiched between said machining support unit and said lower face of said substrate.

17. The system according to claim 16, wherein said fastening member has a diameter at least equal or greater than a diameter of an upper face of said edging member.

18. The system according to claim 16, wherein said fastening member is formed by an adhesive film.

19. The system for the manufacturing of an ophthalmic lens having a first face, a second face opposite to said first face and a peripheral outline linking said first and second faces, said system comprising:
a substrate having a lower face, an upper face opposite to said lower face and a peripheral edge linking said lower and upper faces;
a machining support unit with a surfacing member and an edging member separable from the surfacing member, the machining support unit being configured to receive the substrate, the machining support unit comprising a surfacing member and an edging member separable from the surfacing member, the surfacing member being formed by a ring made from a plastic material molded in a single piece and having a cavity defining an internal space, the ring comprising a body having a generally cylindrical shape and comprising:
- a cylindrical lateral wall which defines an internal lateral face;
- a free edge;
- a tapered wall linked to the cylindrical lateral wall at the opposite of the free edge;
- a bottom wall linked to the tapered wall at the opposite of the cylindrical lateral wall, the tapered wall and the bottom wall defining an internal bottom face of the ring, the internal bottom face and the internal lateral face of the cylindrical lateral wall define the internal space of the cavity of the surfacing member and partially form the mounting face of the machining support unit, together with a face of the edging member;
- a base configured to be mounted on a surfacing machine and on an edging machine, the base comprising a lateral wall linked to the bottom wall, another tapered wall linked to the lateral wall and a bearing face at a free end of the base, the free end being opposite to the bottom wall, and a recess formed in the internal bottom face, the recess forming a housing configured to receive the edging member, the housing belonging to the cavity and the recess comprising a wall linked to the internal bottom face, a bottom linked to the wall of the housing at the opposite of the internal bottom face, and grooves formed in the bottom of the housing;

the substrate is configured to be mounted on the machining support unit and blocked with the machining support unit, the lower face of the substrate face a mounting face of the machining support unit for surfacing the upper face of the substrate and the edging member is located in the internal space of the surfacing member; and the surfacing member is configured to be withdrawn from the machining by retaining the substrate on the edging member for edging the peripheral edge of the substrate.

20. The system for the manufacturing of an ophthalmic lens having a first face, a second face opposite to said first face and a peripheral outline linking said first and second faces, said system comprising:
- a substrate having a lower face, an upper face opposite to said lower face and a peripheral edge linking said lower and upper faces;
- a machining support unit with a surfacing member having a cavity defining an internal space and an edging member separable from the surfacing member, the machining support unit being configured to receive the substrate, the edging member being formed by a pin comprising:
  - a circular flange having a lower face, an upper face opposite to the lower face, and a peripheral outline linking the lower face of the circular flange and the upper face of the circular flange, the upper face having a generally curved-shape and that is configured to partially form the mounting face of the machining support unit; and
  - a block which protrudes from the lower face of the circular flange, the block comprising:
    - a cylindrical lateral wall which extends from the lower face of the circular flange;
    - a beveled portion that is at least partially circular and is linked to the cylindrical lateral wall;
    - a notch diametrically formed in the cylindrical lateral wall; and
    - a bearing face at a free end of the block which is opposite the lower face of the circular flange;

the pin is configured to be accommodated in the surfacing member and to be separable from the surfacing member;

the surfacing member is formed by a ring comprising a body having a generally cylindrical shape and a recess forming a housing configured to receive the pin, the housing belongs to the cavity and the recess comprises grooves separated by a rib, the block of the pin are configured to be partially introduced in the grooves of the ring, the bearing face of the block come into abutment against a bottom of the grooves, the rib of the ring are received in the notch of the pin;

the substrate is configured to be mounted on the machining support unit and blocked with the machining support unit, the lower face of the substrate face a mounting face of the machining support unit for surfacing the upper face of the substrate and the edging member is located in the internal space of the surfacing member; and the surfacing member is configured to be withdrawn from the machining by retaining the substrate on the edging member for edging the peripheral edge of the substrate.

* * * * *